(12) United States Patent
Nocon et al.

(10) Patent No.: US 11,048,108 B2
(45) Date of Patent: Jun. 29, 2021

(54) MULTI-PERSPECTIVE DISPLAY OF AN IMAGE USING ILLUMINATION SWITCHING

(71) Applicant: Disney Enterprises, Inc., Burbank, CA (US)

(72) Inventors: Nathan D. Nocon, Valencia, CA (US); Stephen A. Thornton, Redondo Beach, CA (US); Clifford Wong, Burbank, CA (US); Eric C. Haseltine, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/573,915

(22) Filed: Sep. 17, 2019

(65) Prior Publication Data

US 2021/0080766 A1   Mar. 18, 2021

(51) Int. Cl.
*G02F 1/13*         (2006.01)
*H02P 7/03*         (2016.01)
(Continued)

(52) U.S. Cl.
CPC ...... *G02F 1/1323* (2013.01); *G02F 1/133602* (2013.01); *G06F 1/1601* (2013.01); *H02P 7/03* (2016.02)

(58) Field of Classification Search
CPC ................. G02F 1/133602; G06F 1/10601
(Continued)

(56) References Cited

U.S. PATENT DOCUMENTS 4,687,167 A   8/1987   Skalka et al.
4,943,851 A   7/1990   Lang
(Continued)

FOREIGN PATENT DOCUMENTS

JP   S58-154913 U   10/1983
JP   H1-280992 A    11/1989
(Continued)

OTHER PUBLICATIONS

Yasuhiro Suzuk, et al. "Research of Real World Life-Sized Video Avatar Presentation System," *Proceedings of the Virtual Reality Society of Japan Annual Conference 10*, Sep. 29, 2005, pp. 111-114.
(Continued)

*Primary Examiner* — Calvin C Ma
(74) *Attorney, Agent, or Firm* — Farjami & Farjami LLP (57) ABSTRACT

According to one implementation, a multi-perspective image display system includes a motor configured to spin a rotor, a display screen coupled to the rotor, and a controller. The controller is configured to cause the motor to spin the display screen, using the rotor, about an axis of rotation at a spin rate, and to determine, based on the spin rate, an illumination on-time for an illumination source of the display screen. The controller is also configured to sequentially render each of multiple different perspectives of an image on the display screen during each revolution of the display screen about the axis of rotation and, concurrently with sequentially rendering each of the plurality of perspectives of the image on the display screen, to strobe the illumination source of the display screen based on the determined illumination on-time to display the multiple different perspectives of the image.

20 Claims, 10 Drawing Sheets

(51) Int. Cl.
*G02F 1/13357* (2006.01)
*G06F 1/16* (2006.01)

(58) Field of Classification Search
USPC .......................................................... 345/77
See application file for complete search history.

(56) References Cited

U.S. PATENT DOCUMENTS

| | | | |
|---|---|---|---|
| 5,057,827 A | 10/1991 | Nobile | |
| 5,148,310 A | 9/1992 | Batchko | |
| 5,239,892 A | 8/1993 | Sakai | |
| 5,437,235 A | 8/1995 | Randolph | |
| 5,714,997 A | 2/1998 | Anderson | |
| 5,815,314 A | 9/1998 | Sudo | |
| 6,115,006 A | 9/2000 | Brotz | |
| 6,183,088 B1 | 2/2001 | LoRe | |
| 6,208,318 B1 | 3/2001 | Anderson | |
| 6,481,851 B1 | 11/2002 | McNelley | |
| 6,801,185 B2 * | 10/2004 | Salley .................... | G09F 13/22 345/1.1 |
| 6,886,281 B2 | 5/2005 | Smith | |
| 7,002,604 B1 | 2/2006 | Barrus | |
| 7,477,252 B2 | 1/2009 | Chun | |
| 7,490,941 B2 | 2/2009 | Mintz | |
| 7,587,120 B2 | 9/2009 | Koo | |
| 7,708,640 B2 | 5/2010 | Burak | |
| 8,233,032 B2 * | 7/2012 | Yukich ................. | H04N 13/363 348/48 |
| 8,698,966 B2 | 4/2014 | Liu | |
| 9,053,660 B2 | 6/2015 | Liu | |
| 9,186,595 B1 | 11/2015 | Cannon | |
| 10,310,284 B1 | 6/2019 | Waldron | |
| 2002/0148148 A1 | 10/2002 | Smith | |
| 2003/0142067 A1 | 7/2003 | Kurtenbach | |
| 2004/0082283 A1 | 4/2004 | Lindell et al. | |
| 2004/0196362 A1 | 10/2004 | Hoshino et al. | |
| 2005/0035962 A1 | 2/2005 | Ishibashi et al. | |
| 2005/0083570 A1 | 4/2005 | Ueda et al. | |
| 2005/0284997 A1 | 12/2005 | Tisbo | |
| 2006/0171008 A1 * | 8/2006 | Mintz .................... | G02B 30/54 359/15 |
| 2007/0139769 A1 * | 6/2007 | DeCusatis ............ | H04N 13/341 359/478 |
| 2007/0293299 A1 | 12/2007 | Aida | |
| 2008/0218854 A1 | 9/2008 | Hoshino et al. | |
| 2009/0312979 A1 | 12/2009 | Pan | |
| 2010/0007582 A1 | 1/2010 | Zalewski | |
| 2010/0195055 A1 | 8/2010 | Maekawa | |
| 2011/0199373 A1 | 8/2011 | Liu et al. | |
| 2012/0146897 A1 | 6/2012 | Yoshida et al. | |
| 2012/0194419 A1 | 8/2012 | Osterhout | |
| 2012/0293941 A1 | 11/2012 | Myerchin | |
| 2013/0033650 A1 | 2/2013 | Roberts | |
| 2013/0050198 A1 | 2/2013 | Song | |
| 2013/0100126 A1 * | 4/2013 | Kim ....................... | H04N 13/393 345/419 |
| 2013/0100358 A1 | 4/2013 | De Collibus | |
| 2013/0092805 A1 | 8/2013 | Funk et al. | |
| 2013/0343743 A1 | 12/2013 | Yen | |
| 2014/0091942 A1 | 4/2014 | Matloff et al. | |
| 2014/0118271 A1 | 5/2014 | Lee | |
| 2014/0307068 A1 * | 10/2014 | Song .................... | H04N 13/368 348/54 |
| 2015/0193084 A1 | 7/2015 | Juni | |
| 2015/0212718 A1 | 7/2015 | Kellhammer | |
| 2015/0288857 A1 * | 10/2015 | Fay ....................... | G03B 17/561 348/36 |
| 2017/0009935 A1 | 1/2017 | Theis et al. | |
| 2017/0023911 A1 | 1/2017 | Russell et al. | |
| 2017/0038829 A1 | 2/2017 | Lanier | |
| 2017/0115488 A1 | 4/2017 | Ambrus | |
| 2017/0140791 A1 | 5/2017 | Das et al. | |
| 2017/0343804 A1 | 11/2017 | Choi | |
| 2018/0024373 A1 | 1/2018 | Joseph | |
| 2018/0224678 A1 | 8/2018 | Jung | |
| 2019/0156710 A1 * | 5/2019 | Hanson .................. | G09F 9/302 |

FOREIGN PATENT DOCUMENTS

| | | |
|---|---|---|
| JP | H9-238369 A | 9/1997 |
| JP | 2004-54150 A | 2/2004 |
| JP | 2005-221946 A | 8/2005 |
| JP | 2005-275398 A | 9/2005 |
| JP | 2010-273013 A | 12/2010 |

OTHER PUBLICATIONS

Hikechi Maeda, et al. "Experimental Development and Evaluation of All-Around Display System for Video Avatar in the Real World," *Proceedings of the Virtual Reality Society of Japan Annual Conference 8*, Sep. 3, 2003.

Horimai, Hideyoshi, et al. "Full-Color 3D Display System with 360 Degree Horizontal Viewing Angle." *Proc. Int. Symposium of 3D and Contents*, 2010, pp. 1-4.

File History of Related U.S. Appl. No. 15/888,896, filed Feb. 5, 2018, and titled "Floating Image Display System,".

File History of Related U.S. Appl. No. 15/985,477, filed May 21, 2018, and titled "Electrical Charger For a Spinning Device,".

File History of Related U.S. Appl. No. 15/985,502, filed May 21, 2018, and titled "Display of a Floating Image with Depth Enhacement,".

File History of Related U.S. Appl. No. 15/983,006, filed May 17, 2018, and titled "Multi-Perspective Display of an Image,".

File History of Related U.S. Appl. No. 16/011,505, filed Jun. 18, 2017, and titled "Image Display System With Visual Filter,".

File History of Related Application U.S. Appl. No. 15/888,896, filed Feb. 5, 2018, and titled "Floating Image Display System,".

File History of Related Application U.S. Appl. No. 15/985,477, filed May 21, 2018, and titled "Electrical Charger for a Spinning Device,".

File History of Related Application U.S. Appl. No. 15/985,502, filed May 21, 2018, and titled "Display of a Floating Image with Depth Enhancement,".

File History of Related Application U.S. Appl. No. 15/983,006, filed May 17, 2018, and titled "Multi-Perspective Display of an Image,".

File History of Related Application U.S. Appl. No. 16/011,505, filed Jun. 18, 2018, and titled "Image Display System With Visual Filter,".

* cited by examiner

Example: LCD "TN" Display – 2 Perspectives 180° Apart

$$t_{start} = \left(\frac{2\pi}{N_{segments}} + \Phi_{view\text{-}offset}\right) * \left(\frac{1}{V_{spin\text{-}rate}}\right) - \left(\frac{t_{on\text{-}time}}{2}\right) \quad \text{(Equation 2)}$$

$t_{start}$ = Time to pause before turning on backlight (a.k.a. start time) based on zero point.

$N_{segments}$ = Number of segments to display in one rotation (2,3,4...)

$\Phi_{view\text{-}offset}$ = Shift all the segments by distance from zero point (e.g. 0.175 rads or 10 degrees)

MULTI-PERSPECTIVE DISPLAY OF AN IMAGE USING ILLUMINATION SWITCHING

BACKGROUND

Increases in computing power have made possible the generation of richly featured virtual imagery capable of simulating in-person interactivity. However, the display screens with which many modern communication devices are equipped are typically designed to display a two-dimensional (2D) image from a single viewing perspective. As a result, and despite their ability to display sharp, richly featured, high definition images, interactive group activities centered on those devices, such as multi-player gaming, for example, tend to be less than optimally engaging and immersive if not limited entirely.

An alternative to the conventional approach to providing 2D images is to render interactive group activities using 3D imagery. However, several significant obstacles to wider use of 3D imagery in gaming and entertainment exist. For example, in order to project a 3D image, solutions often entail multiple expensive projectors, multiple sets of augmented reality (AR) headgear, and/or other complex display technology is typically required to create the illusion of a real-world 3D image. Further system complications can occur if the 3D image is to be viewed from multiple perspectives and still maintain a desirable level of realism (e.g., positioning and location of users and images, time synchronization, display performance, user comfort, environmental restrictions, etc.).

SUMMARY

There are provided systems and methods for displaying multiple perspectives of an image using illumination switching, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1A:
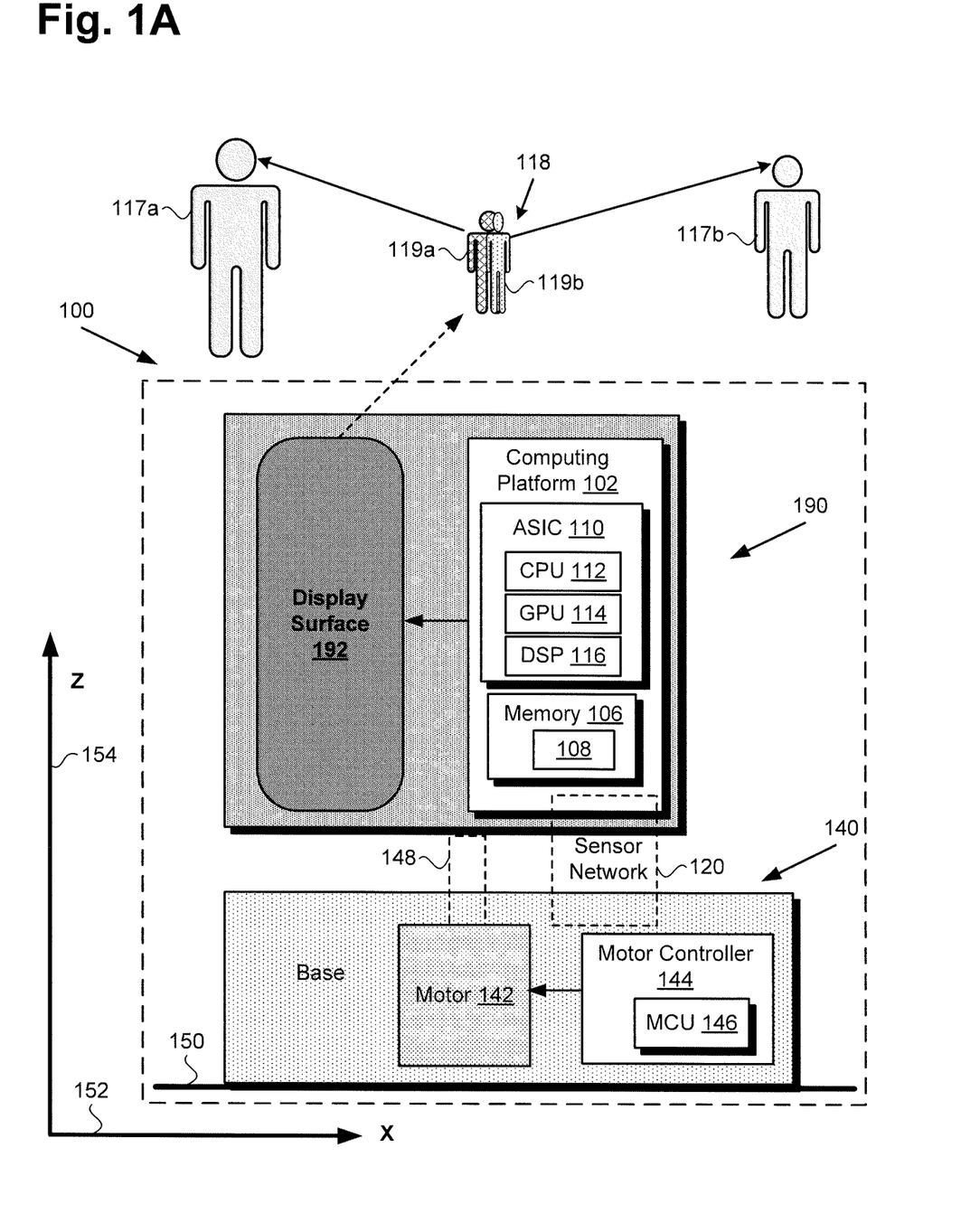
FIG. 1A shows a diagram of an exemplary multi-perspective image display system, according to one implementation.

The present application discloses systems and methods for displaying multiple perspectives of a virtual image using a single display screen that overcome the drawbacks and deficiencies in the conventional art. FIG. 1A shows a diagram of exemplary multi-perspective image display system 100, according to one implementation. As shown in FIG. 1A, multi-perspective image display system 100 includes stationary base 140, and display screen 190 coupled to rotor 148 and configured to rotate with rotor 148.

As further shown in FIG. 1A, display screen 190 includes display surface 192 and computing platform 102 communicatively coupled to display surface 192. Computing platform 102 includes application specific integrated circuit (ASIC) 110 (hereinafter "controller 110") including central processing unit (CPU) 112 implemented as a hardware processor, graphics processing unit (GPU) 114, and may further include digital signal processor (DSP) 116. Computing platform 102 also includes system memory 106 implemented as a non-transitory storage device storing software code 108.

Base 140 includes motor 142 for rotating rotor 148 and display screen 190, and motor control circuit 144 including motor control unit (MCU) 146. Base 140 is situated on surface 150, which may be a floor or any other substantially horizontal surface. In addition, FIG. 1A shows horizontal axis 152 (hereinafter also "X axis 152") substantially parallel to surface 150, and vertical axis 154 (hereinafter also "Z axis 154") substantially perpendicular to surface 150. Also shown in FIG. 1A are sensor network 120 bridging base 140 and display screen 190, and multi-perspective image 118 displayed by display screen 190, as well as observers 117a and 117b viewing respective perspectives 119a and 119b of multi-perspective image 118.

It is noted that although FIG. 1A depicts computing platform 102 as being integrated with display screen 190, that representation is merely exemplary. In other implementations, computing platform 102 may be integrated with base 140. It is further noted that the combination of controller 110, sensor network 120, and motor control circuit 144 enable the necessary time synchronization between the revolutions per minute (rpm) of motor 142 and rotor 148, and the frame rate in frames per second (fps) at which display screen 190 renders images.

By way of definition, as used in the present application, the terms "central processing unit" or "CPU" and "graphics processing unit" or "GPU" have their customary meaning in the art. That is to say, a CPU includes an Arithmetic Logic Unit (ALU) for carrying out the arithmetic and logical operations of controller 110, as well as a Control Unit (CU) for retrieving programs, such as software code 108, from system memory 106. A GPU is configured to reduce the processing overhead of the CPU by performing computationally intensive graphics processing tasks.

In addition, for the purposes of the present application, the term "perspective" refers to the particular viewpoint from which an object, virtual object, or image is viewed by an observer. Referring to FIG. 1A, for example, a perspective of multi-perspective image 118 refers to the location of an observer of multi-perspective image 118 with respect to a circle substantially concentric with rotor 148 of multi-perspective image display system 100, in a plane substantially perpendicular to vertical Z axis 154.

Furthermore, the terms "render" and "rendering" are defined to mean causing one or more images to appear on display screen 190. Thus, rendering an image may mean causing an entirely new image to appear on the display screen, or refreshing an image previously appearing on the display screen.

It is noted that although FIG. 1A shows two observers 117a and 117b and two perspectives 119a and 119b of multi-perspective image 118, that representation is provided merely for conceptual clarity. More generally, observers 117a and 117b may correspond to a single observer, or to more or many more than two observers who may be positioned so as to view multi-perspective image 118 from a variety of different perspectives. For example, in some implementations, observers 117a and 117b may be situated so as to view multi-perspective image 118 from two discrete perspectives located approximately 180° apart on a circle substantially concentric with rotor 148 in a plane substantially perpendicular to vertical Z axis 154. However, in other implementations, observers 117a and 117b may be able to view multi-perspective image 118 from the perspectives of other locations on such a circle substantially concentric with rotor 148, such as four locations approximately 90° apart on the circle, or twenty locations approximately 18° apart, for example.

Figure 1B:
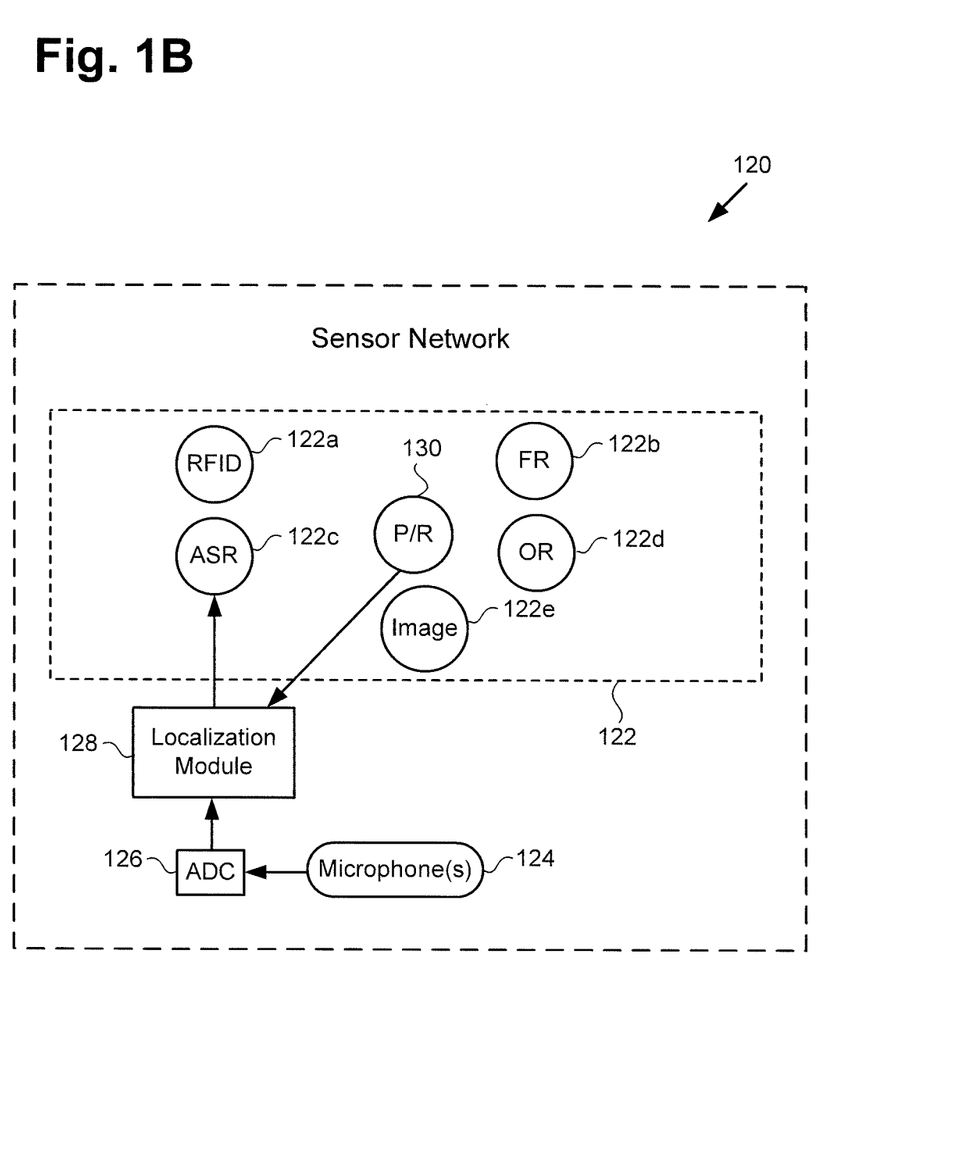
FIG. 1B shows a diagram of an exemplary sensor network suitable for use as part of the multi-perspective image display system of FIG. 1A, according to one implementation.

FIG. 1B shows a more detailed exemplary implementation of sensor network 120, shown in FIG. 1A. As shown in FIG. 1B, sensor network 120 includes multiple sensors and sensing modules 122 controlled by CPU 112 of controller 110. According to the exemplary implementation shown in FIG. 1B, sensor network 120 also includes one or more microphone(s) 124, analog-to-digital converter (ADC) 126, and localization module 128. As further shown in FIG. 1B, sensors 122 of sensor network 120 may include radio-frequency identification (RFID) reader 122a, facial recognition (FR) module 122b, automatic speech recognition (ASR) module 122c, object recognition (OR) module 122d, image sensor 122e, and one or more position and/or rate (P/R) sensor(s) 130.

Figure 1C:
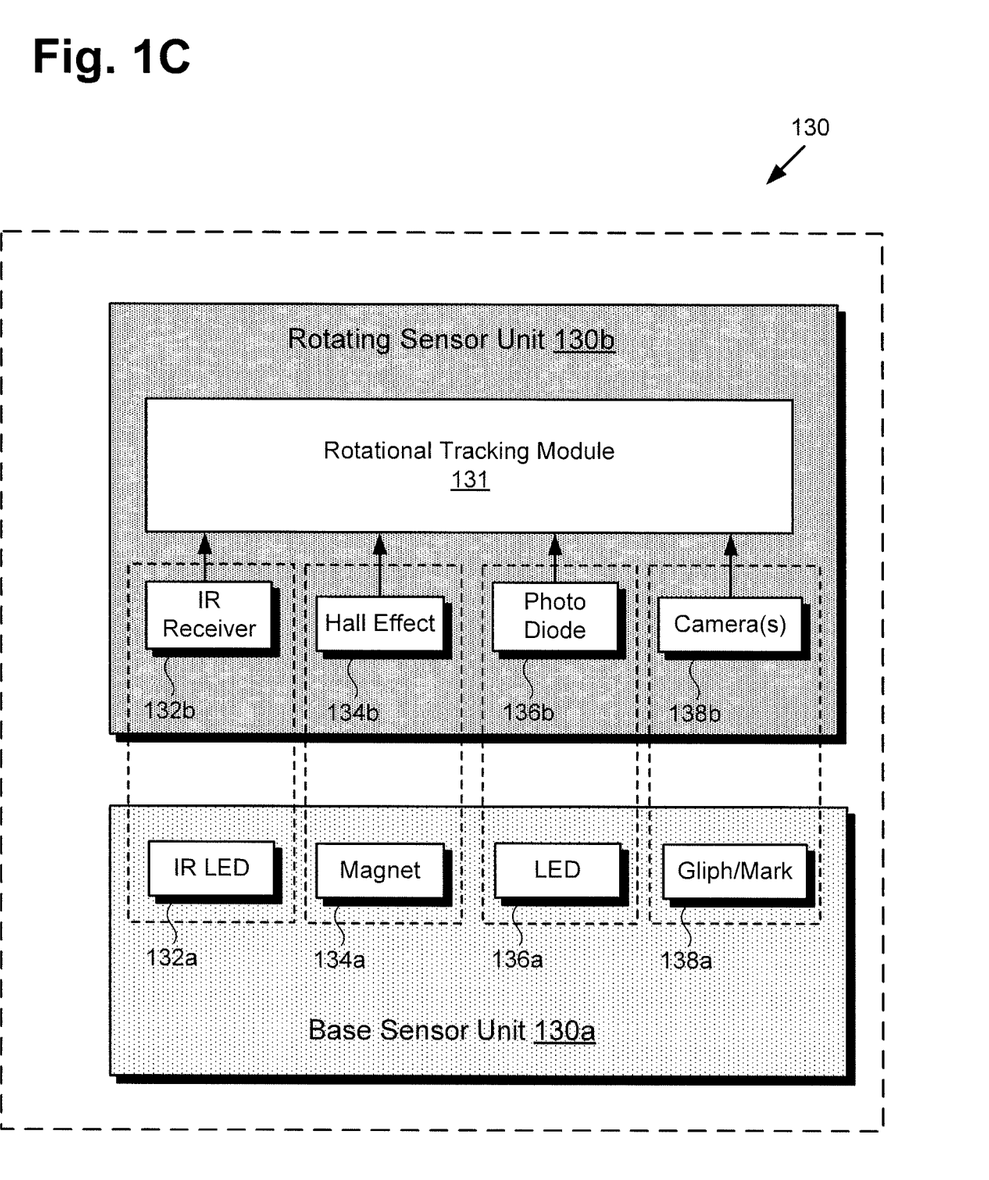
FIG. 1C shows a diagram of exemplary position and/or rate (P/R) sensors suitable for use as part of the multi-perspective image display system of FIG. 1A, according to one implementation.

It is noted that specific examples of P/R sensor(s), including base sensors 130a and rotating sensors 130b are shown in FIG. 1C and are described by reference to that Figure. Regarding, FR module 122b, in FIG. 1B, it is further noted that FR module 122b may include facial recognition software for interpreting image data received from image sensor 122e and/or cameras 138b shown in FIG. 1C to be included among rotating sensors 130b of P/R sensor(s). By way of analogously, OR module 122d may include object recognition software for interpreting image data received from image sensor 122e and/or cameras 138b. By way of further analogy, ASR module 122c may include speech recognition software for determining which sounds sensed using one or more microphone(s) constitute speech by one or more of observers 117a and 117b. Moreover, in some implementations, ASR module may be implemented to interpret speech by observer 117a and/or observer 117b.

It is also noted that the specific sensors and sensing modules shown to be included among sensors 122 of sensor network 120 are merely exemplary, and in other implementations, sensors 122 of sensor network 120 may include more, or fewer, sensors than RFID reader 122a, FR module 122b, ASR module 122c, OR module 122d, image sensor 122e, and P/R sensor(s) 130. RFID reader 122a, FR module 122b, ASR module 122c, OR module 122d, image sensor 122e, and P/R sensor(s) 130 may be implemented using any suitable sensors and software for those respective functions, as known in the art. Microphone(s) 124 may include one or more stationary and/or moving microphone(s). For example, stationary microphone(s) of microphone(s) 124 may be distributed in a 360° array surrounding base 140 to enhance directional sensing of sound, such as speech, produced by one or more of observers 117a and 117b.

In some implementations, one or more moving microphone(s) of microphone(s) 124 may rotate in synchronization with rotor 148 and display screen 190. In those implementations, P/R sensor(s) 130 may be used in combination with microphone(s) 124 to identify the direction from which a sound sensed using microphone(s) 124 is received.

Image sensor 122e may correspond to one or more sensors for obtaining visual images of observers 117a and 117b, as well as the local venue in which multi-perspective image display system 100 and observers 117a and 117b are located. Image sensor 122e may be implemented as one or more stationary and/or rotating video cameras, for example.

As indicated in FIG. 1B, in some implementations, data from P/R sensor(s) 130, and/or data generated by ADC 126 from sounds detected by microphone(s) 124 may be processed by localization module 128 to identify the distance and/or direction of the respective sources of the sounds received by microphone(s) 124, such as observers 117a and 117b. In those implementations, the output from localization module 128 may be provided to ASR module 122c to enhance the performance of ASR module 122c in discriminating among environmental sounds, noise, and purposeful speech by one or more of observers 117a and 117b.

FIG. 1C shows a more detailed exemplary implementation of P/R sensor(s) 130, in FIG. 1B. As shown in FIG. 1C, P/R sensor(s) 130 can include one or more base sensor(s) 130a integrated with base 140, and one or more rotating sensor(s) 130b integrated with display screen 190 and configured to spin with display screen 190.

According to the exemplary implementation shown in FIG. 1C, base sensor(s) 130a may include one or more of infrared (IR) light-emitting diode (LED) 132a, magnet 134a, visible light LED 136a, and glyph or other visible marker 138a, to name a few examples. As further shown in FIG. 1C, rotating sensor(s) 130b may include one or more of IR receiver 132b for sensing IR LED 132a, Hall effect sensor 134b for sensing magnet 134a, photo diode 136b for sensing visible light LED 136a, and one or more camera(s) 138b for sensing glyph or visible marker 138a. In addition, rotating sensor(s) 130b are shown to be coupled to rotational tracking module 131.

It is noted that the distribution of features identified by reference numbers 132a, 134a, 136a, 138a, 132b, 134b, 136b, and 138b between base sensor(s) 130a and rotating sensor(s) 130b is merely exemplary. In another implementation, for example, the positions of features 132a, 134a, 136a, 138a, 132b, 134b, 136b, and 138b may be reversed. That is to say, one or more of IR LED 132a, magnet 134a, visible light LED 136a, and glyph or visible marker 138a may be included as rotating sensor(s) 130b, while one or more of IR receiver 132b, Hall effect sensor 134b, photo diode 136b, and camera(s) 138b may be included as base sensor(s) 130a. It is further noted that camera(s) 138b may include one or more still camera(s) and/or one or more video camera(s), for example. Moreover, in some implementations, P/R sensor(s) 130 may be implemented as an encoder.

As indicated in FIG. 1C, in some implementations, data from one or more of IR receiver 132b, Hall effect sensor 134b, photo diode 136b, and camera 138b is processed by rotational tracking module 131 to identify the rotational position of display screen 190 being tracked by P/R sensor(s) 130 at any point in time. In those implementations, the output from rotational tracking module 131 may be provided to controller 110 or software code 108 to enhance the performance of multi-perspective image display system 100 in displaying perspectives 119a and 119b of multi-perspective image 118.

Figure 2A:
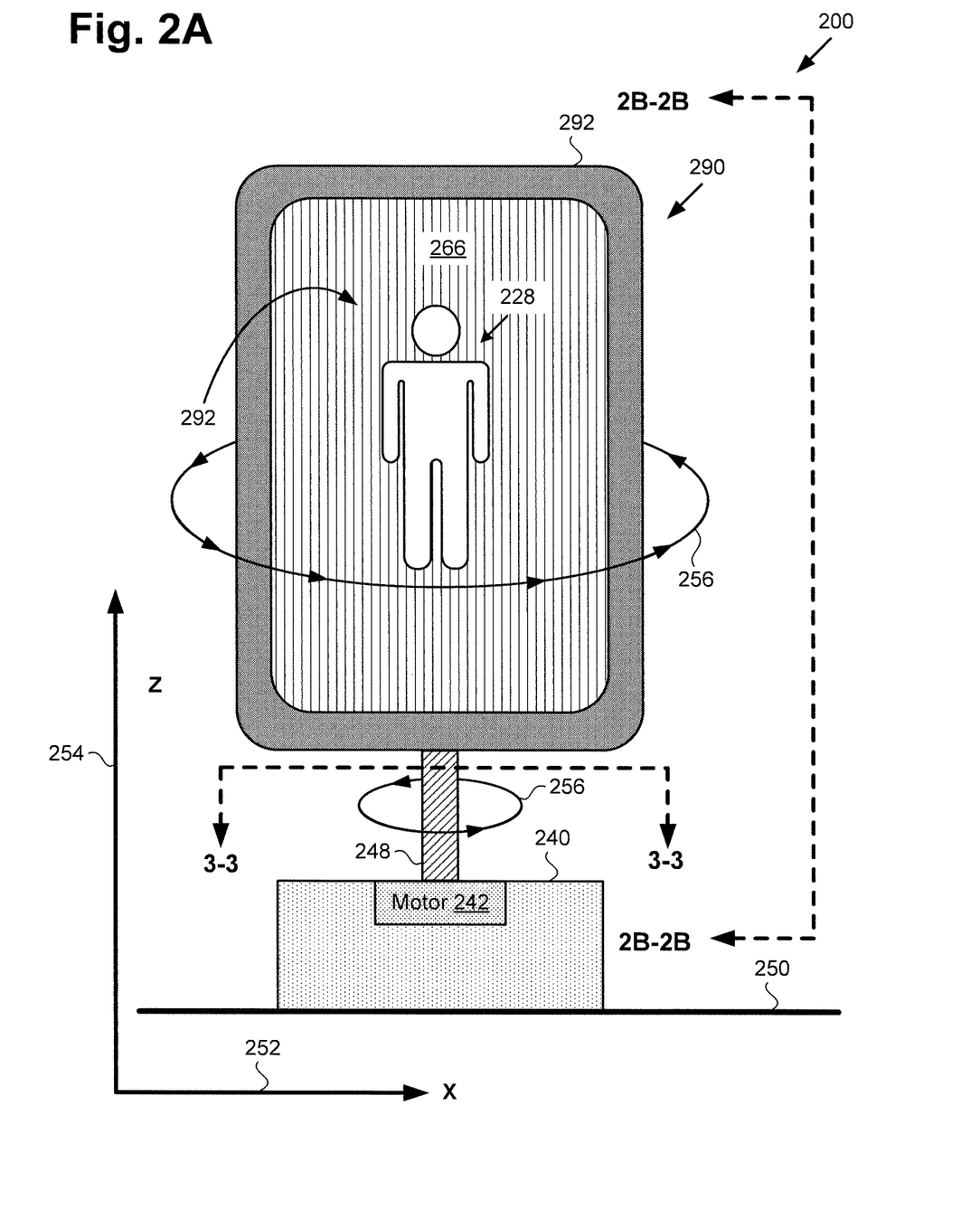
FIG. 2A shows a diagram of an exemplary multi-perspective image display system, according to another implementation.

FIG. 2A shows a diagram of exemplary multi-perspective image display system 200, according to another implementation. As shown in FIG. 2A, multi-perspective image display system 200 includes base 240 and display screen 290. Base 240 is shown to include motor 242, and to be situated on surface 250, which may be a floor or any other substantially horizontal surface. In addition, according to the exemplary implementation shown in FIG. 2A, multi-perspective image display system 200 includes rotor 248 coupled to display screen 290.

Display screen 290 includes display surface 292 having optional privacy screen 266 affixed thereon. Also shown in FIG. 2A are horizontal axis 252 (hereinafter also "X axis 252") substantially parallel to surface 250, vertical axis 254 (hereinafter also "Z axis 254") substantially perpendicular to surface 250, spin direction 256 of rotor 248 and display screen 290, two-dimensional (2D) image 228 rendered on display screen 290, and perspective lines 2B-2B and 3-3.

Multi-perspective image display system 200 corresponds in general to multi-perspective image display system 100, in FIG. 1A. As a result, multi-perspective image display system 200 may share any of the characteristics attributed to multi-perspective image display system 100 by the present disclosure, and vice versa. In addition, rotor 248 and base 240 including motor 242, correspond respectively in general to rotor 148 and base 140 including motor 142, in FIG. 1A. Thus, rotor 248, motor 242, and base 240 may share any of the characteristics attributed to rotor 148, motor 142, and base 140 by the present disclosure, and vice versa. That is to say, although not explicitly shown in FIG. 2A, base 240 includes features corresponding respectively to motor control circuit 144 and MCU 146.

Moreover, display screen 290 including display surface 292, in FIG. 2A, corresponds in general to display screen 190 including display surface 192, in FIG. 1A. Thus, display screen 290 may share any of the characteristics attributed to display screen 190 by the present disclosure, and vice versa. In other words, although not explicitly shown in FIG. 2A, display screen 290 includes features corresponding respectively to controller 110 having CPU 112, GPU 114, DSP 116, and system memory 106 storing software code 108. Furthermore, like multi-perspective image display system 100, multi-perspective image display system 200 includes sensor network 120 bridging base 140/240 and display screen 190/290.

In some implementations, display screen 190/290 may be a liquid-crystal display (LCD) screen, for example, or an organic light-emitting diode (OLED) display screen. For example, when implemented as an LCD screen, display screen 190/290 may take the form of an in-plane switching (IPS) LCD screen or a twisted nematic field effect (TN) LCD screen. Moreover, in some implementations, display screen 190/290 may be provided by a mobile communication device coupled to rotor 148/248, and configured to spin with display screen 190/290. For example, display screen 190/290 may be part of a smartphone or a tablet computer.

In the exemplary implementations shown in FIGS. 1A and 2A, various features and/or techniques may be utilized to reduce flicker and/or blur of multi-perspective image 118 produced by display screen 190/290. For example, optional privacy screen 266 may be affixed to display surface 192/292 of display screen 190/290 so as to restrict viewing of display screen 190/290 outside of a predetermined viewing angle. Such a privacy screen may take the form of a louvered structure affixed to display screen 190/290, or to a privacy film covering display surface 192/292 of display screen 190/290.

Figure 2B:
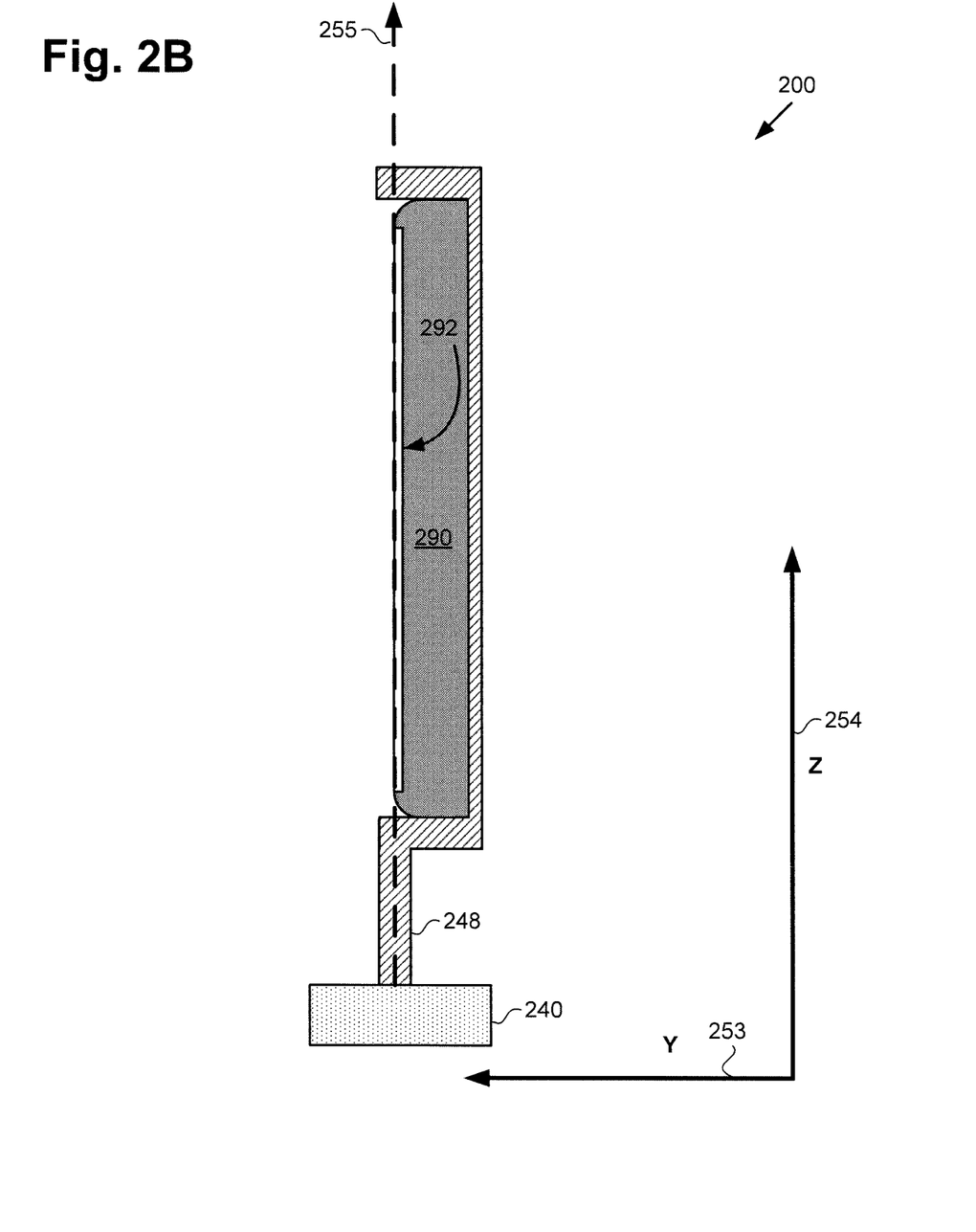
FIG. 2B shows a side view of the exemplary multi-perspective image display system shown in FIG. 2A along perspective lines 2B-2B in that figure, according to one implementation.

FIG. 2B shows a side view of exemplary multi-perspective image display system 100/200 along perspective lines 2B-2B in FIG. 2A, according to one implementation. It is noted that any features in FIG. 2B identified by reference numbers identical to those shown in FIG. 2A correspond respectively to those previously identified features and share their respective characteristics, and vice versa. In addition to the features described above by reference to FIG. 2A, FIG. 2B shows axis of rotation 255 of rotor 148/248 and display screen 190/290, as well as horizontal axis 253 (hereinafter also "Y axis 253") normal to display surface 192/292 and perpendicular to horizontal X axis 152/252 and vertical Z axis 154/254 in FIGS. 1A and 2A.

As shown in FIG. 2B, display surface 192/292 of display screen 190/290 may be situated on axis of rotation 255 of rotor 148/248 and display screen 190/290. For example, in some implementations, display surface 192/292 may be precisely aligned so as to be on axis of rotation 255 and so as to be centered on axis of rotation 255.

Referring to FIGS. 1, 2A, and 2B in combination, display surface 192/292 may be controlled by CPU 112 and/or GPU 114 of controller 110, while rotor 148/248 coupled to display screen 190/290 is controlled by CPU 112 of controller 110 and motor control circuit 144. CPU 112 of controller 110 is configured to execute software code 108 to render 2D image 228 on display screen 190/290 using GPU 114.

CPU 112 is further configured to execute software code 108 to utilize motor control circuit 144 and motor 142/242 to spin rotor 148/248 and display screen 190/290 about axis of rotation 255 parallel to display surface 192/292 of display screen 190/290 at a spin rate to generate multi-perspective image 118 corresponding to 2D image 228. As a specific example, rotor 148/248 and display screen 190/290 may have a spin rate in a range from approximately 900 rpm to approximately 3600 rpm, which translates to a range of time intervals per rotation about axis of rotation 255 from approximately sixty-seven milliseconds per rotation (67 ms/rotation) to approximately 17 ms/rotation. As a result of the rotation of rotor 148/248 and display screen 190/290 as 2D image 228 is rendered on display screen 190/290, multi-perspective image 118 may appear to be floating in space, and/or may appear to be a 3D image corresponding to 2D image 228.

It is noted that CPU 112 of controller 110 may execute software code 108 to control motor 142/242 in order to spin rotor 148/248 and display screen 190/290 about axis of rotation 255 at a varying spin rate, or at a substantially constant predetermined spin rate. It is also noted that spin direction 256 may be in either a counter clockwise direction with respect to the plane of horizontal axes 152/252 and 253, as shown in FIG. 2A, or in a clockwise direction with respect to that plane.

In some implementations, CPU 112 of controller 110 may execute software code 108 to use GPU 114 of controller 110 to change 2D image 228 as rotor 148/248 and display screen 190/290 spin, so as to generate multiple perspectives 119a and 119b of multi-perspective image 118 that are appropriate respectively to the locations of each of observers 117a and 117b. For example, observer 117a located so as to face a front side of multi-perspective image 118 and stationary at that location might consistently view multi-perspective image 118 from frontal perspective 119a. By contrast, observer 117b located so as to face a backside of multi-perspective image 118, i.e., 180° apart from the perspective of observer 117a, and stationary at that location might consistently view multi-perspective image 118 as if from rear perspective 119b.

Figure 3:
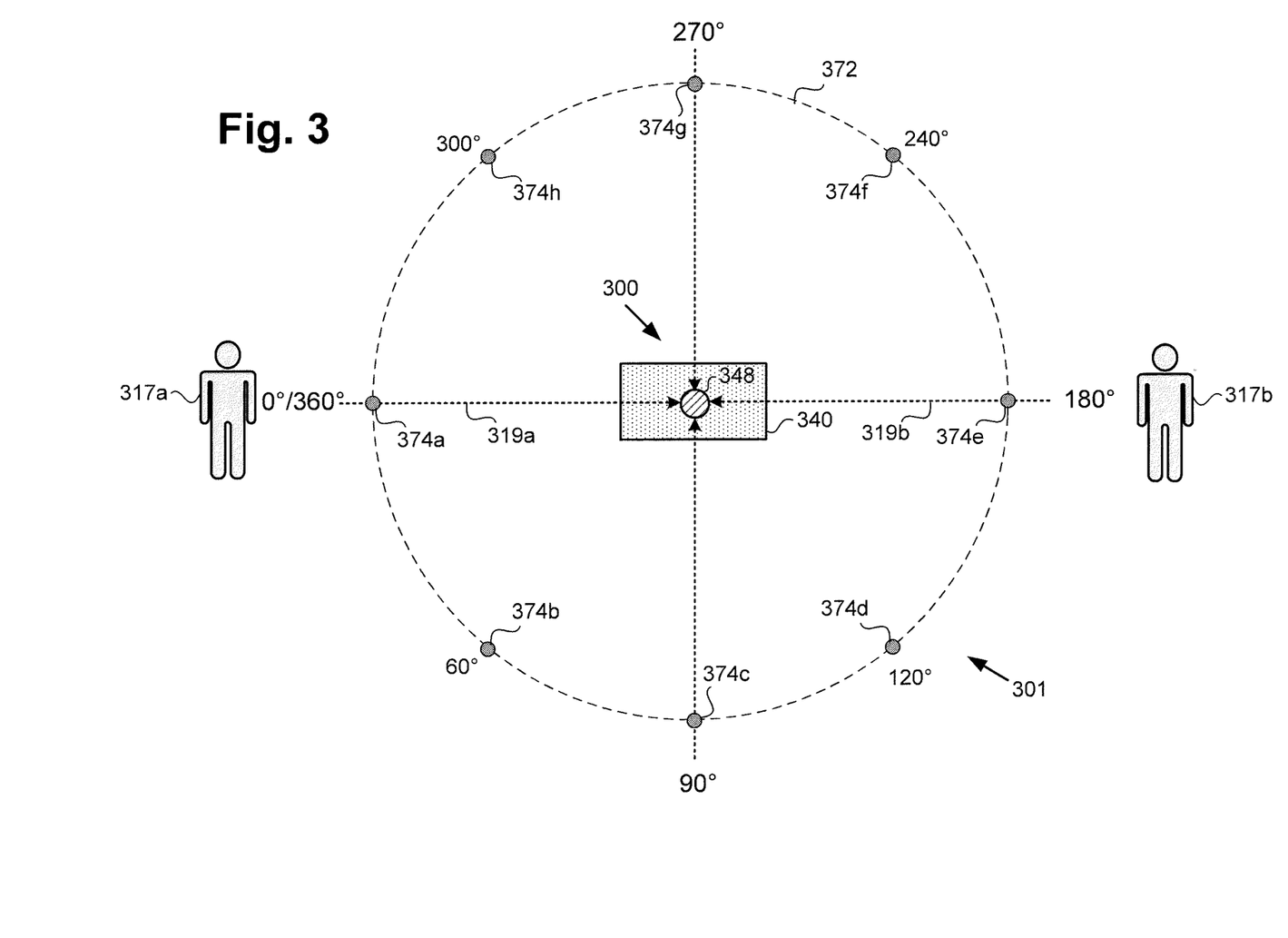
FIG. 3 shows a diagram of exemplary locations for viewing multiple perspectives of an image generated by the systems and according to the methods disclosed in the present application.

FIG. 3 shows a top view of image viewing environment 301 including multi-perspective image display system 300 including rotor 348 and base 340 along perspective lines 3-3 in FIG. 2A. It is noted that display screen 190/290 and internal features of base 340 are not shown in FIG. 3 in the interests of conceptual clarity.

As shown in FIG. 3, image viewing environment 301 also includes circle 372 of exemplary locations 374a, 374b, 374c, 374d, 374e, 374f, 374g, and 374h (hereinafter "locations 374a-374h") from which to observe multi-perspective image 118, in FIG. 1A. Also shown in FIG. 3 are observer 317a viewing perspective 319a of multi-perspective image 118, and observer 317b viewing another perspective 319b of multi-perspective image 118. It is noted that circle 372 including exemplary locations 374a-374h for viewing different perspectives of multi-perspective image 118 is substantially concentric with rotor 348.

Multi-perspective image display system 300 including rotor 348 and base 340 corresponds in general to multi-perspective image display system 100/200 including rotor 148/248 and base 140/240 in FIGS. 1A, 2A, and 2B. Thus, multi-perspective image display system 300, rotor 348, and base 340 may share any of the characteristics attributed to respective multi-perspective image display system 100/200, rotor 148/248, and base 140/240 by the present disclosure, and vice versa. In addition, observer 317a, observer 317b, and perspectives 319a and 319b correspond respectively in general to observer 317a, observer 317b, and respective perspectives 119a and 119b, in FIG. 1A.

In one exemplary implementation, observer 117a/317a may be at location 374a corresponding to a zero crossing of circle 372, i.e., 0° or 360° (or zero or 2π radians) along the circumference of circle 372, as detectable using sensor network 120. From that location, observer 117a/317a may face a front side of multi-perspective image 118, for example, and view multi-perspective image 118 displayed by multi-perspective image display system 100/200/300 from frontal perspective 119a/319a. By contrast, observer 117b/317b located so as to face a backside of multi-perspective image 118 from location 374e, i.e., a location 180° (π radians) apart from location 374a of observer 317a/317a, would view multi-perspective image 118 as if from backside perspective 119b/319b. In other words, in an exemplary use case in which multi-perspective image 118 is observable from two locations corresponding to locations 374a and 374e, multi-perspective image display system 100/200/300 may display two perspectives 119a/319a and 119b/319b of multi-perspective image 118.

In other implementations, however, more perspectives of multi-perspective image 118 may be displayed. For example, in one implementation, circle 372 may include four locations for viewing multi-perspective image 118 that are 90° (π/2 radians) apart with respect to circle 372, e.g., locations 374a, 374c, 374e, and 374g. In that implementation, perspectives 119a/319a and 119b/319b may once again be respective frontal and backside perspectives of multi-perspective image 118, while the perspectives viewable from locations 374c and 374g may be opposing side views of multi-perspective image 118 (i.e. left and right side view perspectives).

As another example, in implementations in which circle 372 includes six locations for viewing multi-perspective image 118, e.g., locations 374a-374h, each of those locations may be 60° (π/3 radians) apart with respect to circle 372. In that implementation, multi-perspective image display system 100/200/300 may be configured to display six distinct perspectives of multi-perspective image 118 that correspond respectively to locations 374a-374h. It should be understood, that with an increasing spin rate and an increasing number of alternating and distinct views (e.g. up to 360 distinct views), an up to 360° holographic view of multi-perspective image 118 may be achieved.

Figure 4:
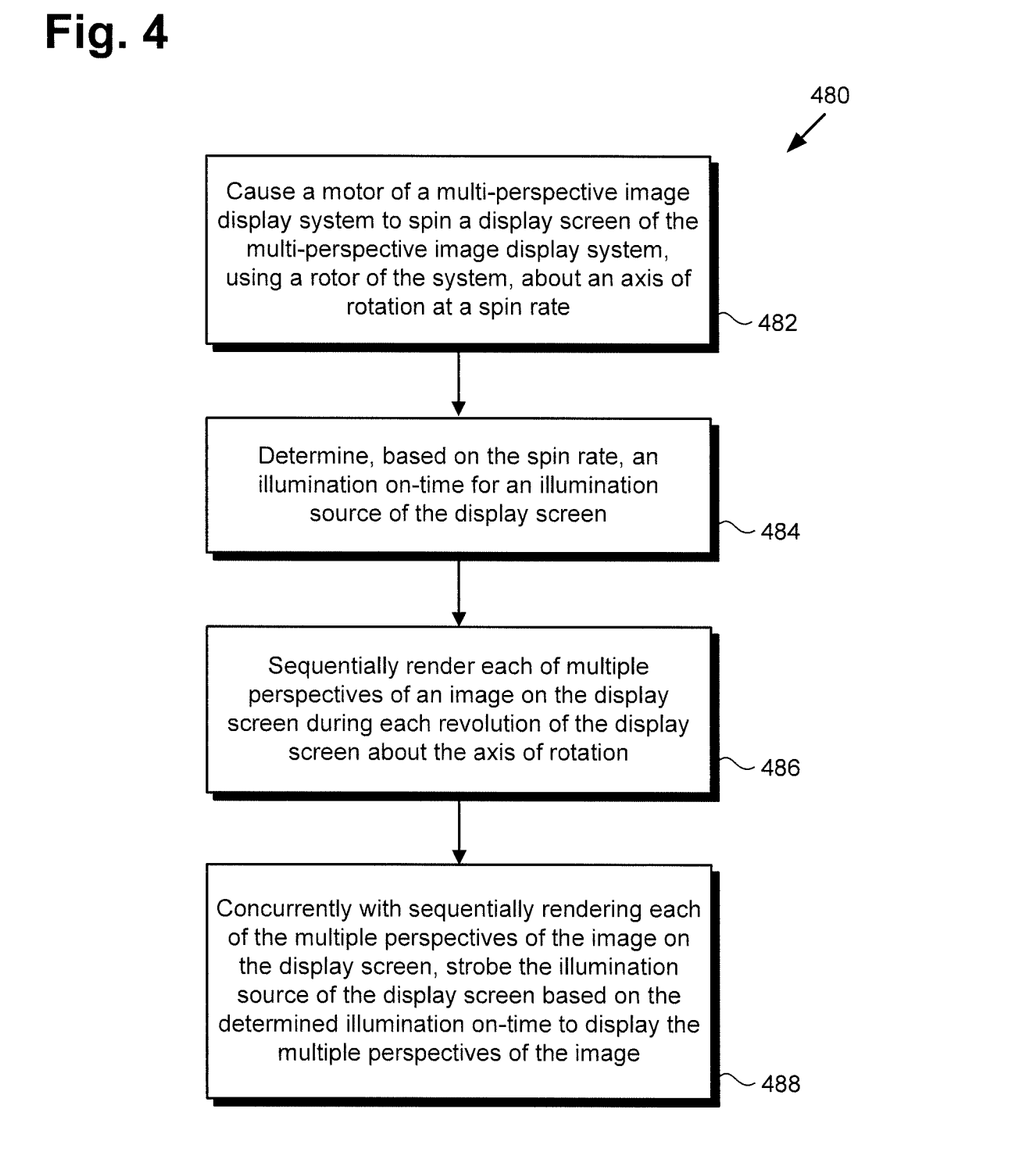
FIG. 4 shows a flowchart outlining an exemplary method for displaying multiple perspectives of an image using illumination switching, according to one implementation.

The functionality of multi-perspective image display system 100/200/300 including base 140/240/340 and display screen 190/290 will be further described by reference to FIG. 4. FIG. 4 shows flowchart 480 of an exemplary method for displaying multiple perspectives of an image using illumination switching, according to one implementation. With respect to the method outlined in FIG. 4, it is noted that certain details and features have been left out of flowchart 480 in order not to obscure the discussion of the inventive features in the present application.

Referring to FIG. 4 in combination with FIGS. 1A, 2A, 2B, and 3, flowchart 480 begins with causing motor 142/242 to spin display screen 190/290, using rotor 148/248/348, about axis of rotation 255 at a spin rate (action 482). In some implementations, controller 110 may be configured to utilize motor control circuit 144 including MCU 146 to cause motor 142/242 to spin rotor 148/248/348 and display screen 190/290 about axis of rotation 255 parallel to display surface 192/292 of display screen 190/290 at a predetermined spin rate, which may be in a range from approximately 900 rpm to approximately 3600 rpm, for example. Alternatively, in some implementations, CPU 112 of controller 110 may be configured to execute software code 108 to use motor control circuit 144 to control motor 142/242 to spin rotor 148/248/348 and display screen 190/290 about axis of rotation 255 at a predetermined spin rate.

According to various implementations of the present inventive concepts, the spin rate of rotor 148/248/348 and display screen 190/290 may depend in part on the frame rate of display screen 190/290. As known in the art, the term "frame rate" refers to the rate or frequency with which a new frame can be rendered on a display, expressed in frames per second (fps). Thus, frame rate is to be distinguished from refresh rate, which is the rate or frequency with which the same frame can be redrawn on a display.

In addition, in some implementations, the spin rate of rotor 148/248/348 and display screen 190/290 may depend in part on the response time of display screen 190/290. It is noted that, as defined in the present application, the term "response time" refers to the time interval required for a frame rendered by CPU 112 and/or GPU 114 of controller 110 to be completely drawn on display surface 192/292 of display screen 190/290. As known in the art, the response time of display screen 190/290 may vary with the display technology used to implement display screen 190/290. For example, as noted above, in some implementations, display screen 190/290 may be an IPS LCD screen, which typically provides excellent color range but a relatively slow response time. However, in other implementations, it may be advantageous or desirable to implement display screen 190/290 as a TN LCD screen having a faster response time but providing an inferior color range when compared to an IPS LCD screen.

Flowchart 480 may continue with determining, based on the spin rate, an illumination on-time for an illumination source of display screen 190/290 (action 484). In implementations in which display screen 190/290 is an emissive display, the illumination source of display screen 190/290 may be OLEDs themselves (e.g., AMOLED displays) or diffused backlighting layered behind an LCD display screen. Alternatively, in some implementations, display screen 190/290 may be implemented as a reflective display screen, such as a projection screen, or may be implemented as a normally emissive display screen utilized in reflective mode. In implementations in which display screen 190/290 is reflective or being used in reflective mode, the illumination source of display screen 190/290 may be a frontlight, such as a projection lamp, for example.

As defined for the purposes of the present application, the term "illumination on-time" of display screen 190/290 refers to the time interval during which the illumination source of display screen 190/290, e.g., backlight or frontlight, is switched on while rotor 148/248/348 and display screen 190/290 spin. At times during the spinning of rotor 148/248/348 and display screen 190/290 outside of the illumination on-time interval, the illumination source of display screen 190/290 is switched off.

Determination of the on-time for the illumination source of display screen 190/290 may be performed by controller 110. In some implementations, CPU 112 of controller 110 may be configured to execute software code 108 to determine the on-time for the illumination source of display screen 190/290 based on the spin rate of rotor 148/248/348 and display screen 190/290.

In some implementations, controller 110 may be configured to determine the illumination on-time for the illumination source of display screen 190/290 further based on a predetermined viewing angle for each of perspectives 119a/319a and 119b/319b of multi-perspective image 118 to be rendered on display screen 190/290. Moreover, in addition, or alternatively, controller 110 may be configured to determine the illumination on-time for the illumination source of display screen 190/290 further based on the response time of display screen 190/290.

In implementations in which the illumination on-time for the illumination source of display screen 190/290 is determined based on a predetermined viewing angle for each of perspectives 119a/319a and 119b/319b of multi-perspective image 118 and the response time of display screen 190/290, in addition to the spin rate, controller 110 may be configured to determine the illumination on time as:

$$t_{on\text{-}time} = 0.159 * (\Phi/V) - t_{response\text{-}time} + t_{offset} \quad \text{(Equation 1)}$$

where $\Phi$ is the predetermined viewing angle expressed in radians, V is the predetermined spin rate of rotor 148/248/348 and display screen 190/290 expressed in Hz, $t_{response\text{-}time}$ is the known display technology's response time in seconds of display screen 190/290, and $t_{offset}$ is the adjustment to account for spin rate variation of display screen 190/290.

It is noted that $t_{offset}$ may be thought of as the "jitter estimate" of the spin rate, i.e., the variance of the actual spin rate of rotor 148/248/348 and display screen 190/290 from the predetermined spin rate V, as measured or estimated via graphics rendering. As a result, in use cases in which the jitter estimate is de minimis, and may be ignored, the $t_{offset}$ term may be omitted from Equation 1. Thus, according to Equation 1, the illumination on-time for the illumination source of display screen 190/290 may be determined based at least on a ratio of the predetermined viewing angle to the spin rate, minus the response time of display 190/290. It is noted that the spin rate $V_{measured}$ may be determined by controller 110 using P/R sensor(s) 130 of sensor network 120.

Flowchart 480 may continue with sequentially rendering each of multiple perspectives 119a/319a and 119b/319b of multi-perspective image 118 on display screen 190/290 during each revolution of display screen 190/290 about axis of rotation 255 (action 486). The sequential rendering of each of multiple perspectives 119a/319a and 119b/319b of multi-perspective image 118 on display screen 190/290 may be performed by controller 110. For example, controller 110 may utilize CPU 112 and/or GPU 114 to sequentially render perspectives 119a/319a and 119b/319b on display screen 190/290 during each revolution of display screen 190/290 about axis of rotation 255. Alternatively, in some implementations, CPU 112 of controller 110 may execute software code 108 to utilize GPU 114 to sequentially render perspectives 119a/319a and 119b/319b on display screen 190/290 during each revolution of display screen 190/290 about axis of rotation 255.

In one implementation, each perspective 119a/319a and 119b/319b of multi-perspective image 118 may correspond to a virtual camera of a virtual world, such as provided by a game engine. For example, multiple perspectives 119a/319a and 119b/319b of multi-perspective image 118 may be provided as though captured by a virtual camera revolving around multi-perspective image display system 100/200/300 on circle 372 in synchronization with rotor 148/248/348 of multi-perspective image display system 100/200/300. As a result, in that implementation, CPU 112 and/or GPU 114 of controller 110 may be configured to render multi-perspective image 118 so as to include virtual world imagery synchronized with the respective real world perspectives of observers 117a/317a and 117b/317b appropriate to their respective locations.

Flowchart 480 may conclude with strobing the illumination source of display screen 190/290 based on the determined illumination on-time to display perspectives 119a/319a and 119b/319b of multi-perspective image 118, where the strobing is performed concurrently with the sequentially rendering of each of multiple perspectives 119a/319a and 119b/319b of multi-perspective image 118 on display screen 190/290 (action 488). Strobing of the illumination source of display screen 190/290 may be performed by controller 110, through the selective switching on and off of a backlight or frontlight illumination source of display screen 190/290, for example, as perspectives 119a/319a and 119b/319b of multi-perspective image 118 are sequentially rendered on display screen 190/290, and as rotor 148/248/348 and display screen 190/290 spin.

Figure 5A:
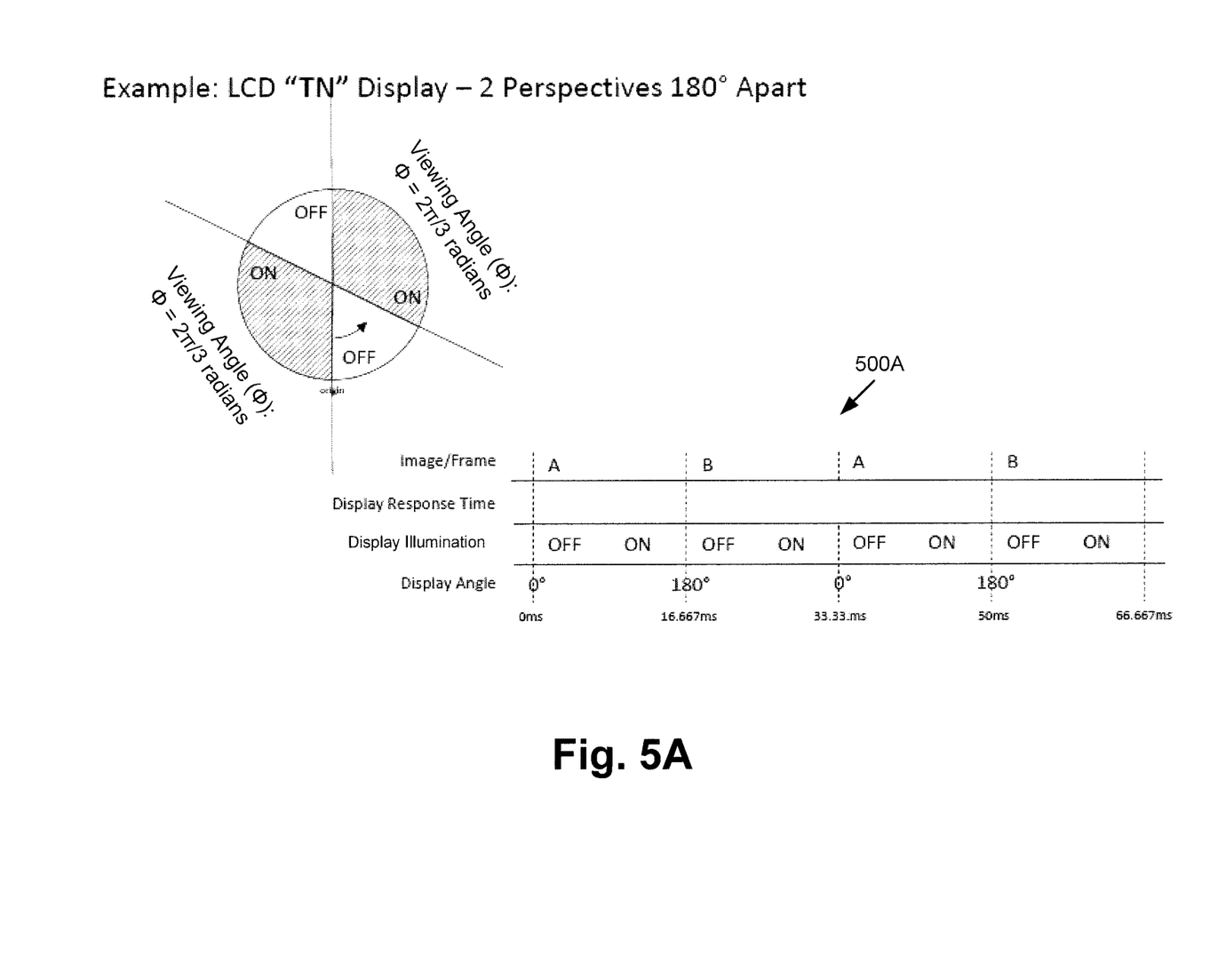
FIG. 5A shows an exemplary timing diagram of illumination switching for display of a multi-perspective image using a twisted nematic field effect (TN) liquid-crystal display (LCD), according to one implementation.
Figure 5B:
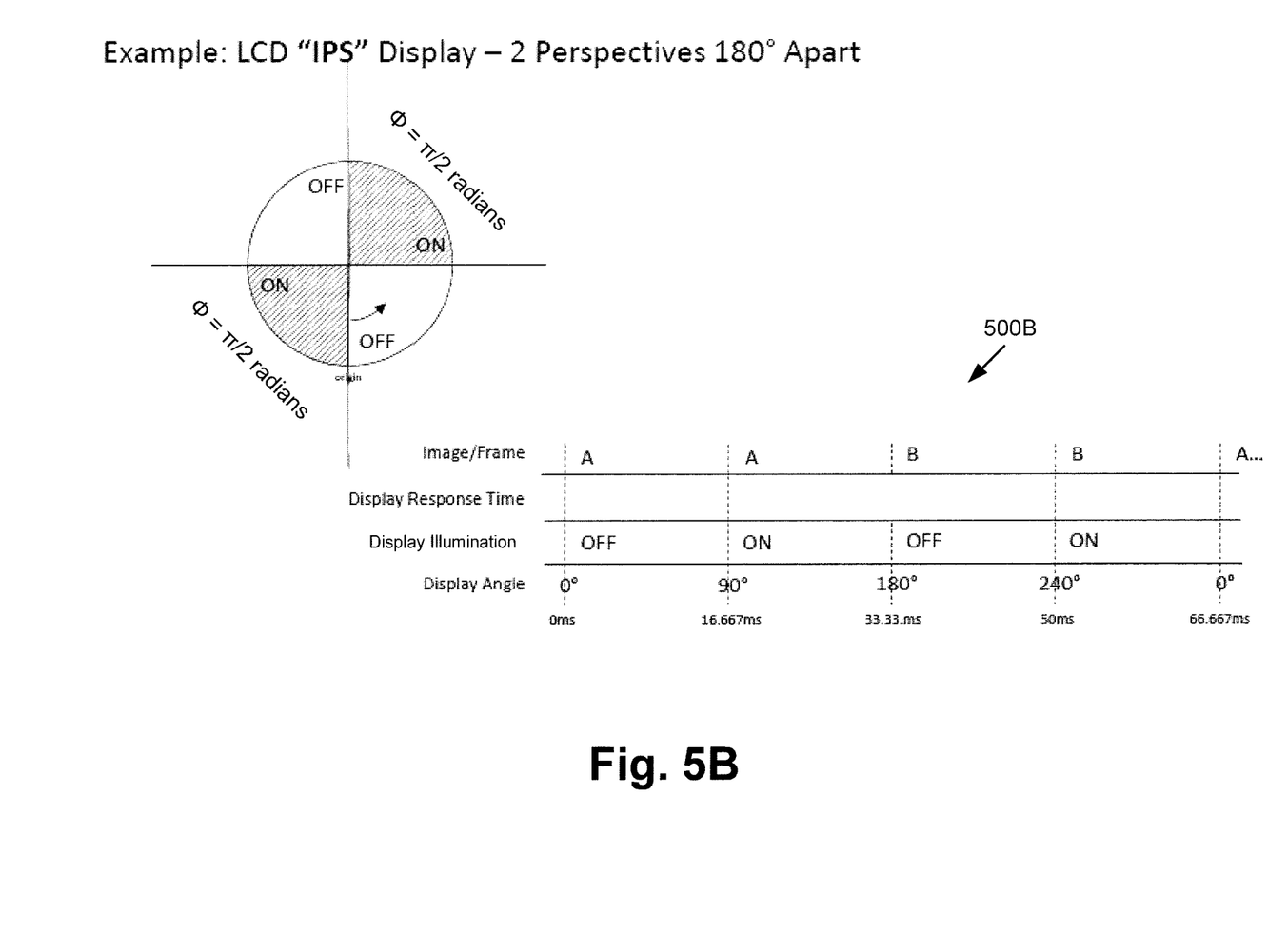
FIG. 5B shows an exemplary timing diagram of illumination switching for display of a multi-perspective image using an in-plane switching (IPS) LCD, according to one implementation.

FIG. 5A shows exemplary timing diagram 500A of illumination switching for two-perspective image display using a TN LCD screen, according to one implementation, while FIG. 5B shows exemplary timing diagram 500B of illumination switching for two-perspective image display using an IPS LCD screen, according to another implementation.

Referring to FIG. 5A, the use case depicted in that figure corresponds to a spin rate of approximately 1800 rpm, or thirty hertz (30 Hz). As shown in FIG. 5A, the relatively fast response time of a TN LCD screen provides a relatively large viewing angle $\Phi$ of approximately $\frac{2}{3}\pi$ radians, or 120°, for each of two perspectives 119a/319a and 119b/319b of multi-perspective image 118.

Referring to FIG. 5B, by contrast, the relatively slow response time of an IPS LCD screen reduces the viewing angle $\Phi$ for each of two perspectives 119a/319a and 119b/319b of multi-perspective image 118 to approximately $$\frac{\pi}{2}$$

radians, or 90°. Moreover, the slower response time of the IPS LCD screen requires a reduced spin rate of approximately 900 rpm, or 15 Hz.

Figure 6:
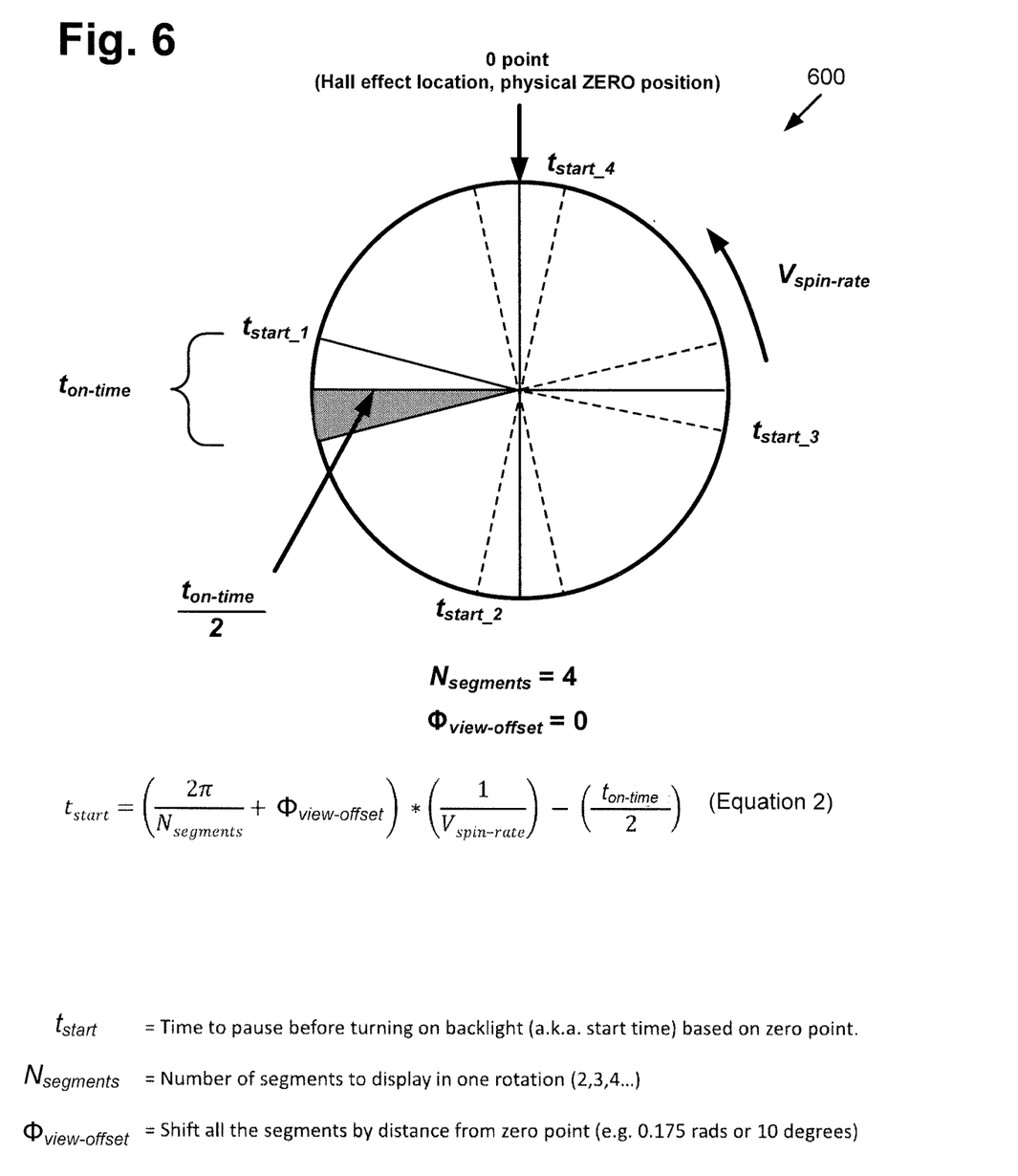
FIG. 6 shows a diagram illustrating the calculation of exemplary start times for illumination of a display as it spins, according to one implementation.

FIG. 6 shows diagram 600 illustrating the calculation of exemplary start times for illumination of a display as it spins, according to one implementation. The timing regime shown in FIG. 6 is implemented in order to create a symmetric viewing effect for multiple perspectives "N". For example, and as shown in FIG. 6, to display four symmetric viewing segments with a ten degree viewing angle, the start time, i.e., the delay interval from the zero position before the start of the first illumination on-time of a rotation is given by Equation 2 as follows:

$$t_{start} = \left(\frac{2\pi}{N_{segments}} + \Phi_{view\text{-}offset}\right) * \left(\frac{1}{V}\right) - \left(\frac{t_{on\text{-}time}}{2}\right) \quad \text{(Equation 2)}$$

where $\Phi_{view\text{-}offset}$ is the shift of the center of the first viewing window from the zero position expressed in radians, V is the predetermined spin rate of rotor 148/248/348 and display screen 190/290 expressed in Hz, and $t_{on\text{-}time}$ is the on-time of the illumination source of display screen 190/290 discussed above.

As noted above, in actual use, the spin rate of rotor 148/248/348 and display screen 190/290 may vary. That is to say, the actual spin rate $V_{measured}$ may include a predetermined desired spin rate and a variance from that predetermined spin rate. Consequently, in some implementations, it may be advantageous or desirable for multi-perspective display system 100/200/300 to use controller 110 to detect the variance from the predetermined spin rate and adjust the spin rate to substantially match the predetermined spin rate using motor 142/242.

However, in other implementations, multi-perspective display system 100/200/300 may use controller 110 to detect the variance from the predetermined spin rate and modify the on-time for the illumination source during action 484, based on the variance from the predetermined spin rate, resulting in an adjusted illumination on-time. In those implementations, controller 110 may then strobe the illumination source of display screen 190/290 based on the adjusted illumination on-time while spinning the display screen at the spin rate including the variance from the predetermined spin rate.

It is noted that, in some implementations, it may be advantageous or desirable to track the movement of one of observers 117a/317a or 117b/317b relative to display screen 190/290 and to render perspective 119a/319a or 119b/319b on display screen 190/290 so as to be viewable by that observer from the same perspective at all locations. For example, where observer 117a/317a is the subject of the tracking, one or more of camera(s) 138b of sensor network 120/220 may be utilized to determine the location of observer 117a/317a relative to display screen 190/290, i.e., the position of observer 117a/317a with respect to exemplary locations 374a-374h of circle 372.

It is further noted that as technologies advance such that rendering frame rates and display refresh rates increase, while display response times decrease, the maximum number of perspectives 119a/319a and 119b/319b can increase, and may increase substantially. As that progress in the technology occurs there will eventually be a limit in which a single frame rendered per viewing angle or perspective will then be required to be a blended frame of one or more closely adjacent views when different observers 117a/317a and 117b/317b are located very close to one another, for example, standing side-by-side or located such that one observer is looking over the shoulder of the other observer.

Thus, the present application discloses systems and methods for displaying multiple perspectives for viewing a virtual image and/or multiple scenes using a single display. By spinning a display screen upon which a 2D image is rendered, about an axis, the present display solution is capable of generating an apparently floating image that may appear to be 3D. In addition, by rendering multiple perspectives of the image on the display screen during each revolution of the display screen about the axis, the present display solution enables observers at various locations to see different perspectives of the image. As a result, the display solutions disclosed in the present application advantageously enable an observer of the image to view a perspective of the image that is appropriate to the location of the observer.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A multi-perspective image display system comprising:
 a motor configured to spin a rotor;
 a display screen coupled to the rotor, the display screen having an illumination source;
 a controller configured to:
  cause the motor to spin the display screen, using the rotor, about an axis of rotation at a spin rate;

while the motor is causing the display screen to spin, determine, based on the spin rate, an illumination on-time for strobing the illumination source of the display screen;

sequentially render a plurality of perspectives of an image, one after another, on the display screen during each revolution of the display screen about the axis of rotation; and concurrently with sequentially rendering, for each of the plurality of perspectives of the image, strobe the illumination source of the display screen for a period corresponding to the determined illumination on-time to display each of the plurality of perspectives of the image during the determined illumination on-time on the display screen.

2. The multi-perspective image display system of claim 1, wherein the spin rate comprises a predetermined spin rate and a variance from the predetermined spin rate, and wherein the controller is further configured to:

detect the variance from the predetermined spin rate; and adjust the spin rate to substantially match the predetermined spin rate using the motor.

3. The multi-perspective image display system of claim 1, wherein the spin rate comprises a predetermined spin rate and a variance from the predetermined spin rate, and wherein the controller is further configured to:

detect the variance from the predetermined spin rate;

modify the determined on-time for the illumination source based on the variance from the predetermined spin rate, resulting in an adjusted illumination on-time; and strobe the illumination source of the display screen based on the adjusted illumination on-time while spinning the display at the spin rate using the motor and the rotor.

4. The multi-perspective image display system of claim 1, wherein the display screen is an emissive display screen and the illumination source is a backlight of the emissive display screen.

5. The multi-perspective image display system of claim 4, wherein the display screen comprises an organic light-emitting diode (OLED) display screen, an in-plane switching (IPS) liquid-crystal display (LCD) screen, or a twisted nematic field effect (TN) LCD screen.

6. The multi-perspective image display system of claim 1, wherein the controller is configured to determine the illumination on-time further based on a predetermined viewing angle for each of the plurality of perspectives of the image to be rendered on the display screen.

7. The multi-perspective image display system of claim 6, wherein the controller is configured to determine the illumination on-time further based on a response time of the display screen.

8. The multi-perspective image display system of claim 7, wherein the controller is configured to determine the illumination on-time further based on a ratio of the predetermined viewing angle to the spin rate, minus the response time of the display screen.

9. The multi-perspective image display system of claim 1, wherein the controller is configured to determine the illumination on-time further based on a response time of the display screen.

10. The multi-perspective image display system of claim 1, wherein the display screen is implemented as a reflective display screen and the illumination source is a frontlight.

11. A method for use by a multi-perspective image display system including a controller, a motor configured to spin a rotor, and a display screen coupled to the rotor, the method comprising:

causing, by the controller, motor to spin the display screen, using the rotor, about an axis of rotation at a spin rate;

while the motor is causing the display screen to spin, determining, by the controller, based on the spin rate, an illumination on-time for strobing the illumination source of the display screen;

sequentially rendering, by the controller, a plurality of perspectives of an image, one after another, on the display screen during each revolution of the display screen about the axis of rotation; and concurrently with sequentially rendering, for each of the plurality of perspectives of the image, strobing, by the controller, the illumination source of the display screen for a period corresponding to the determined illumination on-time to display each of the plurality of perspectives of the image during the determined illumination on-time on the display screen.

12. The method of claim 11, wherein the spin rate comprises a predetermined spin rate and a variance from the predetermined spin rate, the method further comprising:

detecting, by the controller, the variance from the predetermined spin rate; and adjusting the spin rate, by the controller using the motor, to substantially match the predetermined spin rate.

13. The method of claim 11, wherein the spin rate comprises a predetermined spin rate and a variance from the predetermined spin rate, the method further comprising:

detecting, by the controller, the variance from the predetermined spin rate;

modifying, by the controller, the determined on-time for the illumination source based on the variance from the predetermined spin rate, resulting in an adjusted illumination on-time; and strobing, by the controller, the illumination source of the display screen based on the adjusted illumination on-time while spinning the display at the spin rate using the motor and the rotor.

14. The method of claim 11, wherein the display screen is an emissive display screen and the illumination source is a backlight of the emissive display screen.

15. The method of claim 14, wherein the display screen comprises an organic light-emitting diode (OLED) display screen, an in-plane switching (IPS) liquid-crystal display (LCD) screen, or a twisted nematic field effect (TN) LCD screen.

16. The method of claim 11, wherein the controller is configured to determine the illumination on-time further based on a predetermined viewing angle for each of the plurality of perspectives of the image to be rendered on the display screen.

17. The method of claim 16, wherein the controller is configured to determine the illumination on-time further based on a response time of the display screen.

18. The method of claim 17, wherein the controller is configured to determine the illumination on-time further based on a ratio of the predetermined viewing angle to the spin rate, minus the response time of the display screen.

19. The method of claim 11, wherein the controller is configured to determine the illumination on-time further based on a response time of the display screen.

20. The method of claim 11, wherein the display screen is implemented as a reflective display screen and the illumination source is a frontlight.

* * * * *